(12) United States Patent
Stroeher et al.

(10) Patent No.: US 8,376,393 B2
(45) Date of Patent: Feb. 19, 2013

(54) COVERING OF AN INTERIOR ELEMENT OF A MOTOR VEHICLE EQUIPPED WITH AN AIRBAG AND METHOD FOR PRODUCING SUCH A COVERING

(75) Inventors: Matthias Stroeher, Ruesselsheim (DE); Ralf Eidt, Bingen-Gaulsheim (DE); Frank Bausch, Buettelborn (DE)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 13/049,450

(22) Filed: Mar. 16, 2011

(65) Prior Publication Data
US 2011/0227319 A1  Sep. 22, 2011

(30) Foreign Application Priority Data
Mar. 16, 2010  (DE) .......................... 10 2010 011 498

(51) Int. Cl.
*B60R 21/20* (2006.01)
(52) U.S. Cl. ............. 280/728.3; 280/730.2; 297/216.13; 297/216.14
(58) Field of Classification Search ............... 280/728.1, 280/728.2, 728.3, 730.2; 297/216.13, 216.14, 297/216.15
See application file for complete search history.

(56) References Cited

U.S. PATENT DOCUMENTS

| 5,860,673 | A | 1/1999 | Hasegawa et al. | |
| 5,893,579 | A | 4/1999 | Kimura et al. | |
| 5,988,674 | A * | 11/1999 | Kimura et al. | 280/730.2 |
| 6,074,003 | A * | 6/2000 | Umezawa et al. | 297/216.1 |
| 6,206,410 | B1 * | 3/2001 | Brown | 280/728.3 |
| 7,195,274 | B2 * | 3/2007 | Tracht | 280/728.3 |
| 7,278,363 | B2 * | 10/2007 | Wieczorek et al. | 112/475.06 |
| 7,401,806 | B2 * | 7/2008 | Tracht | 280/730.2 |
| 7,677,594 | B2 * | 3/2010 | Hazlewood et al. | 280/728.2 |
| 7,677,596 | B2 * | 3/2010 | Castro et al. | 280/730.2 |

(Continued)

FOREIGN PATENT DOCUMENTS

| DE | 4224822 A1 | 1/1993 |
| DE | 19636660 A1 | 3/1998 |

(Continued)

OTHER PUBLICATIONS

German Patent Office, German Search Report for German Application No. 102010011498.7, dated Dec. 16, 2010.

(Continued)

*Primary Examiner* — Toan To
(74) *Attorney, Agent, or Firm* — Ingrassia Fisher & Lorenz, P.C.

(57) ABSTRACT

A covering is provided for an interior element of a motor vehicle equipped with an airbag and method is provided for producing such a covering. The covering includes, but is not limited to two covering parts arranged in an overlapping manner. The outer covering part in the region of an end facing a piping is formed as a two-layer hem. A piping tab receiving the piping is sewn together with the one covering part with a holding seam. A tearing seam is sewn together with the inner covering part, the piping tab and the inner hem portion. In addition, a double seam is sewn together with the inner and outer hem portion. With the method, the holding seam is sewn in a first step, in another step the tearing seam and in yet another step the double seam.

20 Claims, 1 Drawing Sheet

U.S. PATENT DOCUMENTS

| | | | |
|---|---|---|---|
| 8,210,567 B2 * | 7/2012 | Wieczorek et al. | ........ 280/730.2 |
| 2008/0224454 A1 | 9/2008 | Tracht | |

FOREIGN PATENT DOCUMENTS

| | | | |
|---|---|---|---|
| DE | 29623884 U1 | 7/2000 | |
| DE | 102004003983 B3 | 12/2004 | |
| JP | 10181503 A | 7/1998 | |
| JP | 10309221 A | 11/1998 | |
| JP | 11078759 A | 3/1999 | |

OTHER PUBLICATIONS

British Patent Office, British Search Report for British Application No. 1102099.7 dated May 20, 2011.

* cited by examiner

COVERING OF AN INTERIOR ELEMENT OF A MOTOR VEHICLE EQUIPPED WITH AN AIRBAG AND METHOD FOR PRODUCING SUCH A COVERING

CROSS-REFERENCE TO RELATED APPLICATION

This application claims priority to German Patent Application No. 102010011498.7, filed Mar. 16, 2010, which is incorporated herein by reference in its entirety.

TECHNICAL AREA

The technical field relates to a covering of an interior element of a motor vehicle equipped with an airbag and a method for producing such a covering.

BACKGROUND

In U.S. Pat. No. 5,893,579 a covering of an interior element of a motor vehicle equipped with an airbag is described. This interior element is a backrest of a vehicle seat in the side wing of which the airbag is integrated. With this seat, a piping tab is arranged between a first covering part and a second covering part of the covering which receives a piping.

This piping is arranged on the outside of the covering in the transition of the two covering parts which are arranged flush thus not arranged in an overlapping manner and receive the piping tab between them. The piping tab is sewn to the one covering part by means of a holding seam. In addition, the two covering parts and the piping tab are sewn together by means of a tearing seam for the airbag.

When triggering the airbag, the tearing seam tears so that between the two covering parts a gap for the emergence of the actual airbag from the seat materializes, while the holding seam also in this case ensures the connection of piping to piping tab and the one covering part. The covering is produced in that initially the piping tab is connected to the one covering part by means of the holding seam and then the adjoining ends of the two covering parts directed to the inside, which receive the piping tab between them, sewn together by means of the tearing seam. The piping thus protrudes over the outer surface of the covering or is embedded in a depression formed in the transition in the two covering parts.

It is at least one object to further develop a covering of an interior element of a motor vehicle equipped with an airbag so that the covering in the connecting region of two covering parts on the one hand visually gives a high-quality impression yet safe tearing-open of a tearing seam upon triggering of the airbag is guaranteed. It is additionally at least one object of the invention to state a particularly simple manufacture of the seam arrangement for such a covering. Furthermore, other objects, desirable features and characteristics will become apparent from the subsequent summary and detailed description, and the appended claims, taken in conjunction with the accompanying drawings and this background.

SUMMARY

With the covering according to an embodiment of the invention it is provided that the two covering parts are arranged in an overlapping manner and that one, outer covering part in the region of its end facing the piping is formed as a two-layer hem. Here, the tearing seam is sewn to the inner hem portion and the hem, parallel to the piping, provided with the double seam sewn to the inner and outer hem portion.

Visually, this double seam gives the interior element a high-quality impression. More preferably, such a double ornamental seam is provided with a leather finish of the interior element of the motor vehicle. Only the outer covering part has the double seam in the region of the hem so that by means of the tearing seam only the inner hem portion is fastened, accordingly only this tearing seam has to be severed when triggering the airbag. Although several seams are visible, namely the double seam, only the tearing seam has to be torn open. The holding seam ensures that the piping tab with piping remains firmly connected to the associated covering part. Piping tab and piping are thus not located in the movement path of the airbag when the airbag is triggered.

In that several seams and the piping are not present in the tear-open region of the covering, accordingly only the tearing seam has to be torn open, a short triggering time of the airbag located in the interior element materializes. The interior element can be any of a wide range of elements in the vehicle which are intended to accommodate an airbag. More preferably these are vehicle seats, door coverings and rear side upholstery that are particularly suitable for receiving side airbags.

Another embodiment of the covering is obtained if the double seams are arranged parallel to each other and otherwise run parallel to the piping. The piping is more preferably positioned directly at the free end of the outer covering part. Accordingly, the piping immediately follows the outer covering part and gives this arrangement a visually particularly high-quality impression. Preferentially, the holding seam is arranged adjacent to the piping. Accordingly, fastening of the piping tab to the associated covering part is affected adjacently to the piping, whereby the piping visible from the outside is accurately positioned. The tearing seam is then more preferably arranged at a larger spacing from the piping. The double seam is preferentially positioned at an even greater spacing from the piping. This arrangement of the double seam at an adequate spacing from the free end of the outer covering part, thus the end of the hem, visually gives the covering a particularly high-quality impression in the region of the double seam.

The seam arrangement can be produced particularly easily if in a first step the piping tab is sewn to the inner covering part by means of the holding seam, in a second step the inner covering part, the piping tab and the inner hem portion of the outer covering part are sewn to the tearing seam and in a third step the two hem portions of the outer covering part are sewn together with the double seam. With this third step a presser foot for sewing of a hem thoroughly known from the prior art is used.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
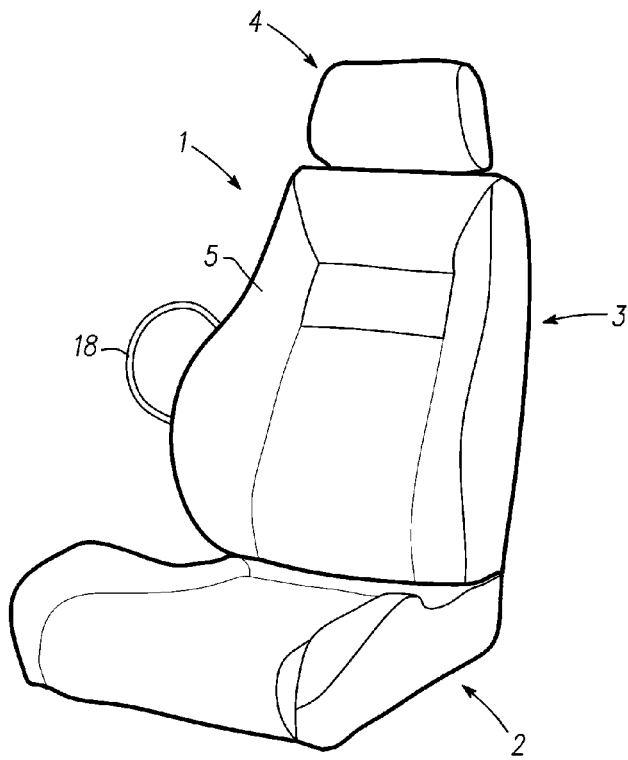
FIG. 1 is a co-driver's seat of a passenger car in a three-dimensional representation.

FIG. 1 shows an interior element 1 of a motor vehicle, which in the concrete case is designed as vehicle seat 1. This is the co-driver's seat. Said seat comprises a seat part 2, a backrest 3 that is connected to the former in a pivotable and lockable manner and a headrest 4 mounted in the backrest 3. The backrest 3 comprises side wings 5/side cushions on both sides, wherein in the side wing 5 arranged on the right in forward driving direction of the vehicle, which faces the co-driver's door of the vehicle, a side airbag which is not shown, is integrated. In the region of this side wing 5 a tearing seam is provided which upon triggering of the airbag, tears and allows the actual airbag of the airbag to emerge from the side wing 5 of the vehicle seat 1 through the opening thus formed. The region in which the tearing seam is provided in and in which the airbag can consequently emerge is illustrated in FIG. 1 by a circle 18.

Figure 2:
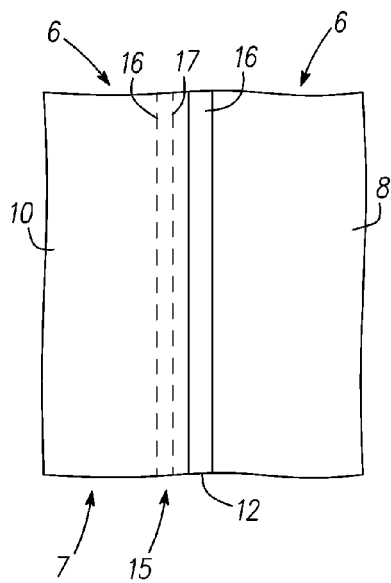
FIG. 2 is a top view of the invention-relevant region of the side wing of the backrest of the seat illustrated with circle in FIG. 1.
Figure 3:
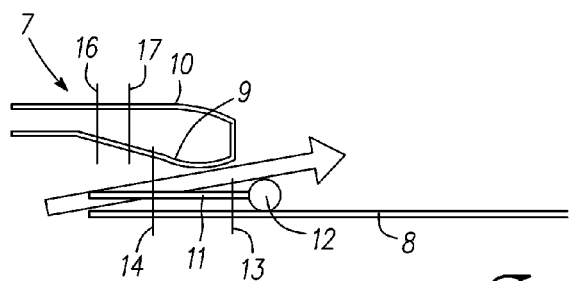
FIG. 3 is a schematic representation of the arrangement according to FIG. 2 for the case of the triggering of the airbag.

FIG. 2 illustrates this detail region at an enlarged scale and FIG. 3 schematically illustrates the arrangement of the relevant elements of the seat in a cross section. It is illustrated that the covering 6 of the vehicle seat 1, concretely the covering 6, in the part region of the vehicle seat 1 affecting the side wing 5 consists of leather, wherein an outer covering part 7 overlaps an inner covering part 8. The inner covering part 8 is formed as a single layer while the outer covering part 7 in the region of its end is formed as a hem, thus in two layers, with an inner hem portion 9 and an outer hem portion 10. Between the covering parts 7 and 8 a piping tab 11 is arranged which receives a piping 12.

This piping is arranged on the outside of the covering in the transition from the outer covering part 7 to the inner covering part 8. The covering in the region of the piping tab 11 is produced in that in a first step the piping tab 11 by means of a holding seam 13 run parallel to the piping 12 is sewn to the inner covering part 8. This holding seam 13 is arranged adjacently to the piping 12.

Following this, thus in a second step, the inner covering part 8, the piping tab 11 and the inner hem portion 9 of the outer covering part 7 are sewn together by means of a tearing seam 14. The latter is arranged at a greater spacing from the piping 12 than the holding seam 13. The piping 12, the holding seam 13 and the tearing seam 14 are arranged parallel to one another. In a third step the two hem portions 9 and 10 of the outer covering part 7 are sewn together with a double seam 15, which thus is not sewn together with the piping tab 11 and also not with the inner covering part 8. The two seams 16 and 17 of the double seam 15 run parallel to each other and at a greater distance to the piping 12 than the holding seam 13 and the tearing seam 14. In top view of the covering according to FIG. 2, the visually high-quality impression of the connecting region of the two covering parts 7 and 8 with the eye-catching piping 12 and the eye-catching double seam 15 materializes.

In the FIG. 3, the shown components of the seam connections are drawn moved slightly apart in order to better identify the individual components. In addition, by way of the arrow in FIG. 3, the path of the airbag when triggering the airbag is illustrated. It is clearly evident that the airbag only has to tear open the tearing seam 14. With torn-open tearing seam 14 the covering parts 7 and 8 are moved away from each other, substantially perpendicularly to the movement direction of the airbag and in the process the holding seam 13 ensures that the piping 12 with piping tab 11 on triggering of the airbag does not protrude into the movement path of the airbag. All seams 13, 14, 16 and 17 are arranged at least substantially parallel to one another and at least substantially parallel to the piping 12.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A covering of an interior element of a motor vehicle equipped with an airbag, comprising:
   a first covering part;
   a second covering part; and
   a piping tab configured to receive a piping that is arranged on an outside of the covering in a transition of the first covering part and the second covering part,
   an outer covering part that is sewn to the piping tab with a holding seam; and
   a tearing seam sewing together the first covering part, the second covering part and the piping tab,
   wherein the first covering part and the second covering part are arranged in an overlapping manner and the outer covering part in a region of an end facing the piping is formed as an inner hem portion and an outer hem portion, and
   wherein the tearing seam is sewn to the inner hem portion that is at least substantially parallel to the piping and provided with a double seam that is sewn together with the inner hem portion and the outer hem portion.

2. The covering according to claim 1, wherein the tearing seam is arranged closer to the piping than the double seam.

3. The covering according to claim 1, wherein the double seam in the region of the piping tab is sewn together with the inner hem portion and the outer hem portion.

4. The covering according to claim 1, wherein the holding seam is arranged adjacently to the piping.

5. The covering according to claim 4, wherein the holding seam is arranged between the piping and the tearing seam.

6. The covering according to claim 1, wherein the holding seam and the tearing seam are arranged at least substantially parallel to each other.

7. The covering according to claim 6, wherein seams of the double seam are arranged at least substantially parallel to the holding seam.

8. The covering according to claim 6, wherein seams of the double seam are arranged at least substantially parallel to the tearing seam.

9. The covering according to claim 1, wherein the holding seam and the tearing seam are arranged at least substantially parallel to the piping.

10. The covering according to claim 1, wherein the holding seam and seams of the double seam are arranged at least substantially parallel to the piping.

11. A method for producing a covering, comprising:
   sewing a piping tab together with an inner covering part with a holding seam;
   sewing the inner covering part, the piping tab and an inner hem portion of an outer covering part together with a tearing seam; and sewing the inner hem portion and an outer hem portion together with a double seam.

12. The method according to claim 11, wherein sewing the inner covering part, the piping tab, and the inner hem portion of the outer covering part together with the tearing seam comprising sewing the tearing seam closer to the piping than the double seam.

13. The method according to claim 11, further comprising sewing the double seam in a region of the piping tab together with the inner hem portion and the outer hem portion.

14. The method according to claim 11, wherein sewing the piping tab together with the inner covering part with the holding seam comprising arranging the holding seam adjacent to the piping.

15. The method according to claim 14, further comprising arranging the holding seam between the piping and the tearing seam.

16. The method according to claim 11, wherein the holding seam and the tearing seam are arranged at least substantially parallel to each other.

17. The method according to claim 16, wherein seams of the double seam are arranged at least substantially parallel to the holding seam.

18. The method according to claim 16, wherein seams of the double seam are arranged at least substantially parallel to the tearing seam.

19. The method according to claim 16, wherein the holding seam and the tearing seam are arranged at least substantially parallel to the piping.

20. The method according to claim 11, wherein the holding seam and seams of the double seam are arranged at least substantially parallel to the piping.

* * * * *